(12) United States Patent
Choi (10) Patent No.: US 8,787,446 B2
(45) Date of Patent: Jul. 22, 2014

(54) METHOD OF TRANSMITTING DATA

(75) Inventor: Seung Hyun Choi, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1527 days.

(21) Appl. No.: 11/863,082

(22) Filed: Sep. 27, 2007

(65) Prior Publication Data

US 2008/0079815 A1     Apr. 3, 2008

(30) Foreign Application Priority Data

Sep. 28, 2006 (KR) .................. 10-2006-0094707

(51) Int. Cl.
*H04N 7/12* (2006.01)

(52) U.S. Cl.
USPC .................. 375/240.01; 348/211.3; 348/739; 386/224; 386/230

(58) Field of Classification Search
None
See application file for complete search history.

(56) References Cited

U.S. PATENT DOCUMENTS

| 6,453,073 | B2 * | 9/2002 | Johnson ...................... 382/239 |
| 2001/0043744 | A1 * | 11/2001 | Hieda ........................ 382/232 |
| 2004/0051793 | A1 * | 3/2004 | Tecu et al. ................ 348/231.99 |
| 2007/0047841 | A1 * | 3/2007 | Berkner et al. .............. 382/298 |
| 2007/0050810 | A1 * | 3/2007 | Imaizumi ...................... 725/37 |

FOREIGN PATENT DOCUMENTS

| CN | 1466384 A | 1/2004 |
| JP | 10-304334 A | 11/1998 |

* cited by examiner

*Primary Examiner* — Nicholas Sloms
(74) *Attorney, Agent, or Firm* — Birch, Stewart, Kolasch & Birch, LLP

(57) ABSTRACT

A method and device for transmitting data are discussed. In an embodiment of the present invention, a display state of image data for which transmission is requested is checked, and all or part of image data is transmitted depending on the checked state. The image data is downsampled and compressed into N layers having small-size screens, and all or some of the N compressed layers can be transmitted. In an embodiment, when the display state is in a separation display mode, some of the N layers created from image data for each channel for which transmission is requested are transmitted. When the display state is in a 1 channel display mode, all N layers created from image data for a channel for which transmission is requested are transmitted.

12 Claims, 7 Drawing Sheets

FIG. 1

(PRIOR ART)

FIG. 2

(PRIOR ART)

FIG. 3

1 CH Display Mode

| |
|---|
| CH1 |

4 CH Display Mode

| CH1 | CH2 |
|---|---|
| CH3 | CH4 |

9 CH Display Mode

| CH1 | CH2 | CH3 |
|---|---|---|
| CH4 | CH5 | CH6 |
| CH7 | CH8 | CH9 |

16 CH Display Mode

| CH1 | CH2 | CH3 | CH4 |
|---|---|---|---|
| CH5 | CH6 | CH7 | CH8 |
| CH9 | CH10 | CH11 | CH12 |
| CH13 | CH14 | CH15 | CH16 |

User 1 Display Mode

| CH1 | | CH2 |
|---|---|---|
| | | CH3 |
| CH4 | CH5 | CH6 |

User 2 Display Mode

| CH1 | | CH2 |
|---|---|---|
| | | CH3 |
| | | CH4 |
| CH5 | CH6 | CH7 | CH8 |

METHOD OF TRANSMITTING DATA

This application claims the priority benefit to Korean Patent Application No. 10-2006-94707, filed on 2006-09-28, which is hereby incorporated by reference as if fully set forth herein.

BACKGROUND OF THE INVENTION

1. Field of the Invention

The present invention relates, in general, to a method of transmitting data, and more particularly, to a method in which a Digital Video Recorder (DVR) connected to a plurality of cameras can efficiently transmit image data over a network.

2. Description of the Related Art

Recently, a Digital Video Recorder (DVR) is commercialized and is thus implemented such that a plurality of monitoring cameras can be installed in a place requiring security in order to capture a monitored image, and captured image data is transmitted to a DVR, located at a remote place, and is recorded in the DVR.

Figure 1:
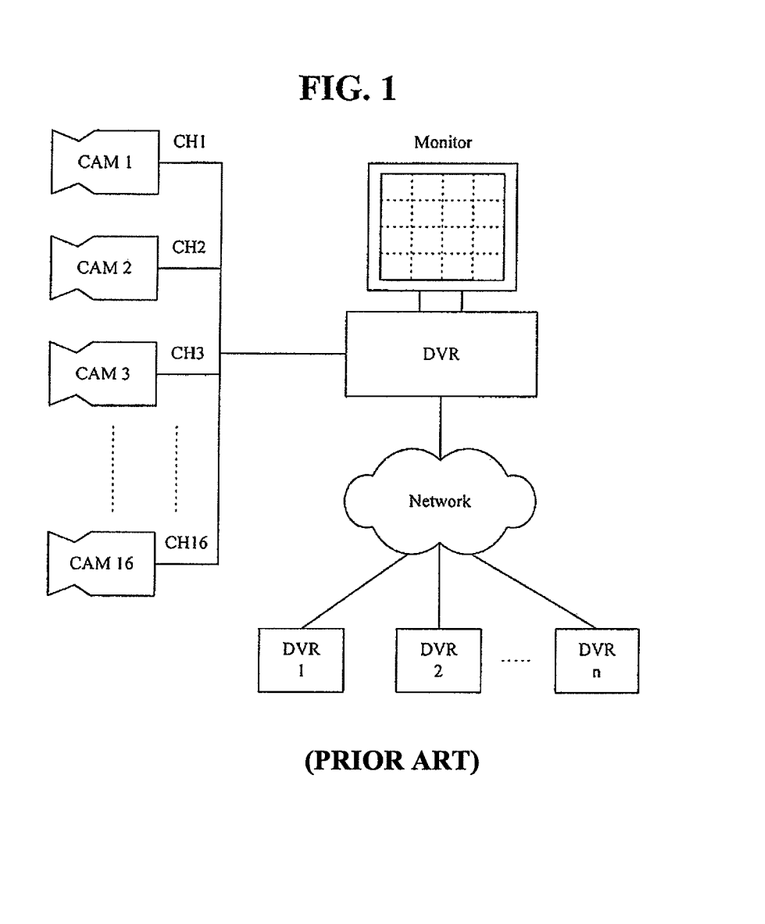
FIG. 1 is a diagram showing the state in which a plurality of DVRs are connected to each other over a network, to which the present invention can be implemented.

FIG. 1 is a diagram showing the state in which DVRs DVR1 to DVRn are connected to each other over a network.

Each of the DVRs can be connected to, for example, 16 cameras CAM1 to CAM16. Further, unique channel numbers CH1 to CH16 can be assigned to the respective cameras.

Figure 2:
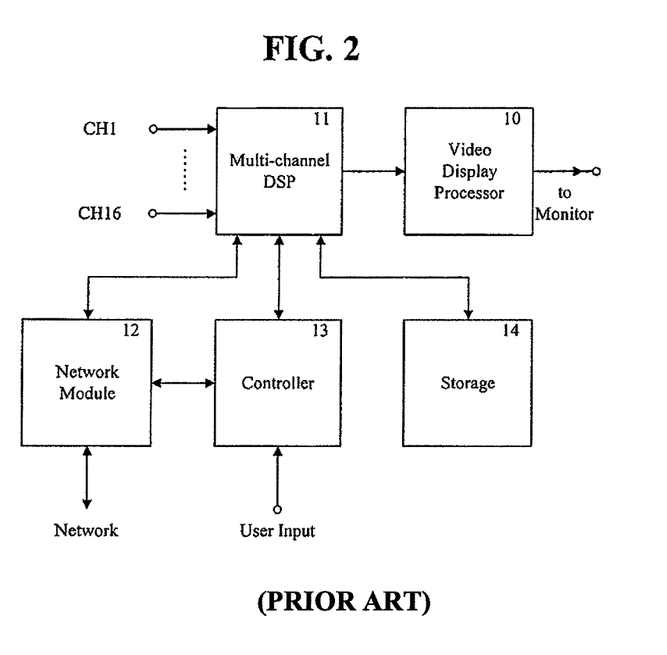
FIG. 2 is a diagram showing the construction of a DVR according to a related art.

As shown in FIG. 2, each of the DVRs includes a video display processor 10, a multi-channel Digital Signal Processor (DSP) 11, a network module 12, a controller 13, and a storage 14.

The multi-channel DSP 11 processes camera image signals respectively received through the first to sixteenth channels CH1 to CH16 as digital image data, compresses the digital image data to be suitable for a predetermined format, for example, an MPEG format, etc., and records the compressed data in the storage 14, such as a hard disc or an optical disc, for respective channels.

The controller 13 reads and reconstructs the data recorded in the storage 14 by controlling the multi-channel DSP 11 at the request of a user, thus enabling played video to be displayed on a monitor screen through the video display processor 10. Further, the controller 13 can be connected to a network, such as the Internet, through the network module 12.

Recently, when a multi-channel DVR is implemented, a request for remote playback through a network has increased. Therefore, as shown in FIG. 1, when a DVR located at a remote place (for example, DVRn) requests the transmission of image data for a specific channel, which has been recorded in the storage 14, the controller 13 controls the multi-channel DSP 11, thus reading the image data for the specific channel, for which transmission is requested, from the storage 14, and transmitting the image data through the network module 12.

Accordingly, the DVRs connected to each other over the network can share camera images recorded in respective storage blocks, with each other.

However, several problems may occur in that, when camera images for a plurality of channels are transmitted to another DVR over the network, errors occur in data transmission due to the increase in the communication load of the network. As a result, images are broken, and image display is interrupted, so that video is discontinuously played back.

SUMMARY OF THE INVENTION

Accordingly, the present invention has been made keeping in mind the above problems and other limitations associated with the related art, and an object of the present invention is to provide a method of improving image data transmission efficiency in a digital video recorder.

In order to accomplish the above and other objects, the present invention provides a method of transmitting image data, comprising checking a display state of image data for which transmission is requested; and transmitting all or part of the image data depending on a checked display state, wherein the image data is downsampled and compressed into N layers having small-size screens, and all or some of the compressed N layers are transmitted.

In an embodiment of the present invention, the image data may be downsampled in a lateral direction and a vertical direction at a rate of 1:n (where n×n=N, n>1), thus forming a single layer. For example, N is preferably a positive integer.

In an embodiment of the present invention, when the display state is in a separation display mode, all or some of N layers, created from image data for each channel for which transmission is requested, may be transmitted. Further, when the display state is in a 1 channel display mode, all of N layers, created from image data for a channel for which transmission is requested, may be transmitted.

In an embodiment of the present invention, when a display size allocated to a channel for which transmission is requested is not greater than a screen size of each layer created from the image data for the channel, a single layer, among the N layers created from the image data for the channel, may be transmitted, otherwise all of the N layers created from the image data for the channel may be transmitted.

In an embodiment of the present invention, a number of layers corresponding to a number of pixels, which corresponds to a display size allocated to the channel, among N layers created from the image data for the channel for which transmission is requested, may be transmitted.

In an embodiment of the present invention, with respect to channels for which two or more layers need to be transmitted, only part of the two or more layers may be transmitted, according to transmission environment.

In an embodiment of the present invention, when two or more layers are transmitted, a transmission sequence of respective layers may be adjusted. Further, when image data for two or more channels is transmitted, one layer for each of the channels may be transmitted, and, subsequently, remaining layers of channels, requiring transmission of two or more layers, may be transmitted.

In an embodiment of the present invention, when transmission of image data is requested, information about numbers of respective channels for which transmission is requested, and information about a display size allocated to each channel may be transmitted therewith. Further, each of the layers may include a header, which contains information about a number of a channel to which a given layer belongs, the number of layers included in the channel to which the given layer belongs, a number of the given layer, and a screen size of the given layer.

The present invention is also directed to a DVR and system for implementing the methods of the present invention.

According to an embodiment, the present invention provides a device for transmitting image data, comprising: a controller configured to check a display state of image data for which transmission is requested; a data processor configured to downsample the image data and compress the sampled data into N layers having small-size screens; and a transmitting unit to transmit all or some of the compressed N layers depending on the checked display state.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, embodiments of a method of transmitting data and the device related thereto according to the present invention will be described in detail with reference to the attached drawings.

Figure 3:
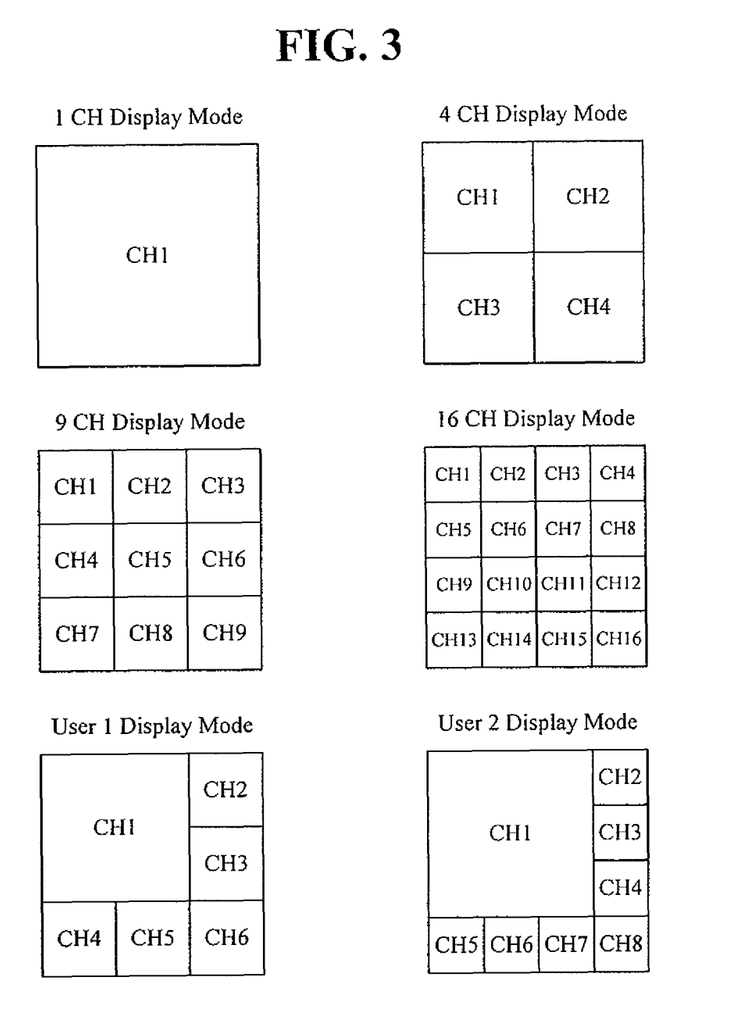
FIG. 3 is a diagram showing the screen display state of a DVR.

As shown in FIG. 3, a Digital Video Recorder (DVR) can select one mode from among various display modes, such as a 1 channel display mode, a 4 channel display mode, a 9 channel display mode, a 16 channel display mode, and a user display mode (e.g., user 1 display mode, user 2 display mode, etc.) and can display camera images for various channels on a single monitor screen.

In the 1 channel display mode, an image for a single channel is displayed on the entire screen, so that the DVR requires all of the frame data of a camera image for a given channel. However, in the remaining display modes, since images for a plurality of channels are separately displayed on the entire screen, the DVR reduces the size or resolution of the image data for the respective channels even if all of the image data for the respective channels is provided, thus displaying the reduced image data in regions allocated to the corresponding channels. This means that, in a separation display mode, all of the image data for respective channels may not be necessary.

Therefore, in the present invention, part or all of image data for one or more channels, for which transmission is requested, is transmitted depending on the display state of a counterpart DVR. A camera image for each channel is downsampled into a plurality of images having sizes smaller than that of an original image screen, and the images are compressed and recorded. Alternatively, the camera image may be recorded at an original screen size, and may be downsampled and compressed into a plurality of images for transmission.

The sizes of images captured and generated by a monitoring camera vary slightly depending on which company manufactured the camera, and can be typically classified into a Common Intermediate Format (CIF) having a 352×240 pixel size, High Definition 1 (HD1) having a 704×240 pixel size, and D1 having a 704×480 pixel size.

In the present invention, an image having a CIF size is compressed without change, and an image having an HD1 or D1 size is downsampled to create two or four images each having a CIF size and to compress respective images. In this case, a downsampled small-size image (having a CIF size), or data compressed from this image is defined as a layer.

Figure 4:
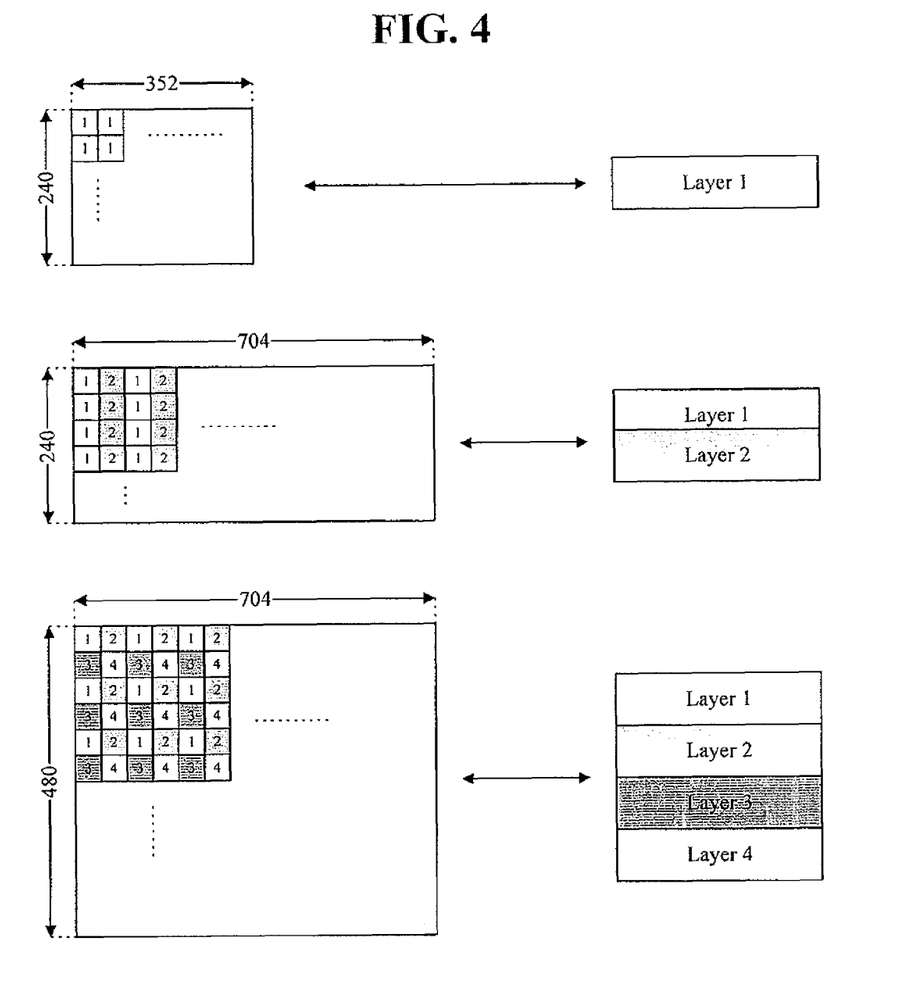
FIG. 4 is a diagram showing an example in which an image is downsampled to obtain two or four layers according to an embodiment of the present invention.

A method of downsampling an image having an HD1 or D1 size and obtaining two or four layers, as an example of the present invention, is shown in FIG. 4. In the case of HD1, respective pixels are downsampled in a lateral direction at a rate of 1:2 (that is, they are divided into odd-numbered pixels (layer 1) and even-numbered pixels (layer 2) in the lateral direction), thus obtaining two layers, each having a CIF size.

Further, in the case of D1, respective pixels are downsampled in a lateral direction and a vertical direction at a rate of 1:2, thus obtaining four layers each having a CIF size. As shown in FIG. 4, respective pixels are sampled on the basis of two pixels in the lateral direction and two pixels in the vertical direction (that is, a square block of four pixels), and pixels sampled at the corresponding location in respective square blocks, each composed of four pixels, are collected to create a single layer.

In other words, all odd-numbered pixels arranged in the lateral direction and odd-numbered pixels arranged in the vertical direction (layer 1), all even-numbered pixels arranged in the lateral direction and odd-numbered pixels arranged in the vertical direction (layer 2), all odd-numbered pixels arranged in the lateral direction and even-numbered pixels arranged in the vertical direction (layer 3), and all even-numbered pixels arranged in the lateral direction and even-numbered pixels arranged in the vertical direction (layer 4) are separately collected, and thus four layers, each having a CIF size, are obtained.

Further, in the present invention, all or some layers for each channel for which transmission is requested are transmitted with respect to each channel depending on the display state of a DVR having requested the transmission of image data, thus improving image transmission efficiency through the network.

The data transmission method according to the present invention can be applied to various types of DVRs for receiving a plurality of camera image signals, for example, image signals from 16 cameras, through first to sixteenth channels CH1 to CH16, as described above with reference to FIG. 1.

Figure 5:
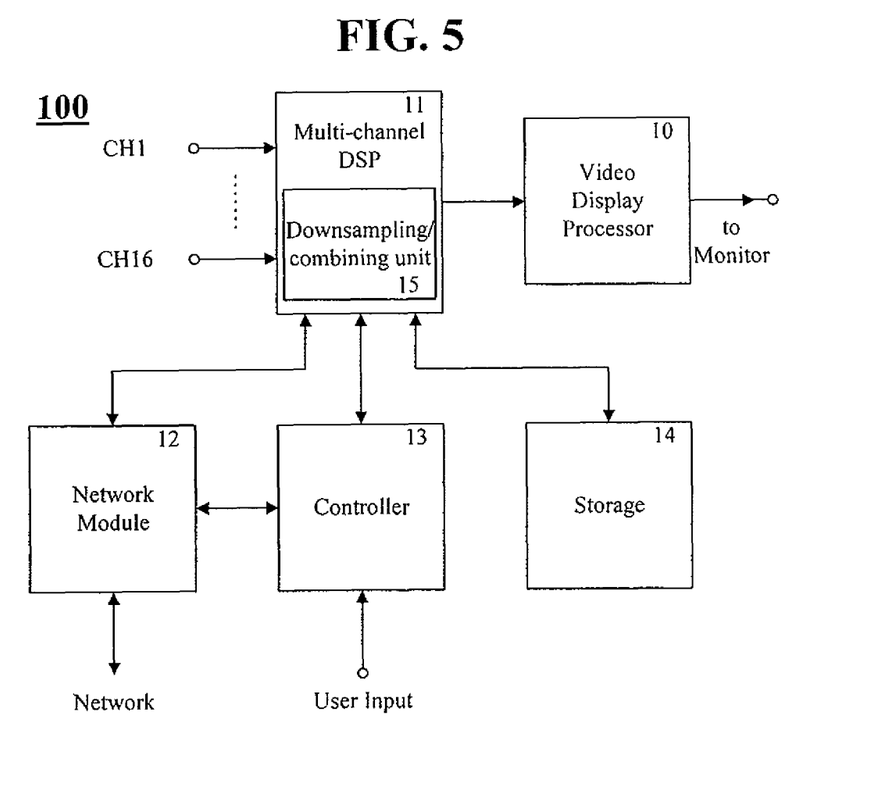
FIG. 5 is a diagram showing the construction of a DVR to which the present invention is applied.

The DVR 100, to which the present invention is applied, includes a video display processor 10, a multi-channel DSP 11, a network module 12, a controller 13, and a storage 14, and further includes a downsampling/combining unit 15, as shown in FIG. 5. The DVR can include other known components. For instance, a monitor/screen can be part of the DVR or associated with the DVR. All the components of the DVR are operatively coupled and configured.

The downsampling/combining unit 15 may be included in the multi-channel DSP 11 to implement the functions thereof. By the downsampling/combining unit 15, camera image data for a single channel is downsampled, and thus pieces of image data corresponding to N small-size screens, for example, 2, 4, or 9 small-size screens (image data corresponding to N layers), are obtained.

Further, the downsampling/combining unit 15 combines image data corresponding to N small-size screens (N layers)

with each other, thereby obtaining image data having an original screen size. All or some of N layers are combined with each other, so that image data having an original screen size or having a size smaller than an original screen size can be obtained.

For example, when image data is downsampled and separated into 9 layers, image data having a size which is ⅔ of the original screen size can be obtained using image data corresponding to first, second, fourth, and fifth layers.

By way of another example, when image data is downsampled and separated into 4 layers, image data having an original screen size is obtained using image data corresponding to the first layer and the fourth layer, but the remaining pixels, which cannot be provided by the first layer and the fourth layer (all even-numbered pixels in the lateral direction and odd-numbered pixels in the vertical direction, and all odd-numbered pixels in the lateral direction and even-numbered pixels in the vertical direction) may be obtained by interpolating the first layer and the fourth layer.

Similar to this, image data having an original screen size is obtained using image data corresponding to the first layer and the second layer (or third layer), but even-numbered pixels in the vertical direction (or even-numbered pixels in the lateral direction), which cannot be provided by the first layer and the second layer (or third layer), may be obtained by interpolating the first layer and the second layer (or the third layer) (that is, performing interpolation in the vertical direction (or in the lateral direction)).

The multi-channel DSP 11 compresses image data corresponding to the downsampled N layers to be suitable for a predetermined format, such as an MPEG format, for respective layers, and records the compressed image data in the storage 14 and/or external memory unit.

For example, image data having a 352×240 pixel size (CIF) is compressed and recorded as a first layer, image data having a 704×240 pixel size (HD1) is compressed and recorded as two layers each having a 352×240 pixel size (CIF) (that is, a first layer (Layer 1) and a second layer (Layer 2)), and image data having a 704×480 pixel size (D1) is compressed and recorded as four layers each having a 352×240 pixel size (CIF) (that is, a first layer (Layer 1), a second layer (Layer 2), a third layer (Layer 3), and a fourth layer (Layer 4)).

When image data for one or more channels is transmitted to a counterpart DVR over a network, the controller 13 checks the display state of the counterpart DVR, and reads and transmits all of N pieces of layer data for a single channel, for which transmission is requested and which is separately recorded in the storage 14 for respective layers if a current mode of the counterpart DVR is not a separation display mode. In contrast, if a current mode of the counterpart DVR is a separation display mode, the controller 13 reads and transmits all or part of N pieces of layer data for each channel, for which transmission is requested and which is separately recorded for respective layers. Here, the counterpart DVR may or may not have the configuration of the transmitting DVR of FIG. 5.

When image data is recorded in the storage 14, the controller 13 compresses and records the image data without downsampling the image data by controlling the multi-channel DSP 11. Only when the transmission of image data has been requested by another DVR, the controller 13 can downsample and compress image data, which is currently being captured, into N layers, or image data, which is recorded in the storage 14, into N layers by controlling both the multi-channel DSP 11 and the downsampling/combining unit 15.

Further, when transmitting, e.g., by controlling the network module 12, two or more layers for channels, for which transmission is requested (for example, first-channel data, which has been separated into four image layers), the controller 13 can transmit data in the sequence of the first layer, the fourth layer, the second layer (or third layer), and the third layer (or second layer), instead of transmitting the data in the sequence of the first layer, the second layer, the third layer, and the fourth layer. The reason for this is to recover the second and third layer data to some degree by interpolating the first layer and the fourth layer in the event that the transmission of the second layer data and/or third layer data fails after the first and fourth layer data has been transmitted.

Further, when transmitting two or more layers for one or more of the two or more channels, for which transmission is requested (by way of simple example, when transmitting first to fourth layers for the first channel having four layers, and transmitting only a first layer for the second channel), the controller 13 can transmit layers in the sequence of the first layer for the first channel, the first layer for the second channel, the fourth layer for the first channel, the second layer for the first channel, and the third layer for the first channel, instead of transmitting all of the layers for the first channel and subsequently transmitting the first layer for the second channel.

According to the present invention, the transmission sequence of channels and/or layers can be changed in this way or other way so that some of the layers, the transmission of which failed, can be recovered at least to some degree using the transmitted data.

Each layer includes a header containing information related to a given layer (e.g., information enabling a given layer to be distinguished from other layers and to be distinguished from layers for other channels). The header of each layer may include the number of the channel to which the given layer belongs, the number of layers included in the channel, to which the given layer belongs, and the number of the given layer, and may further include the image resolution of the given layer.

Figure 6:
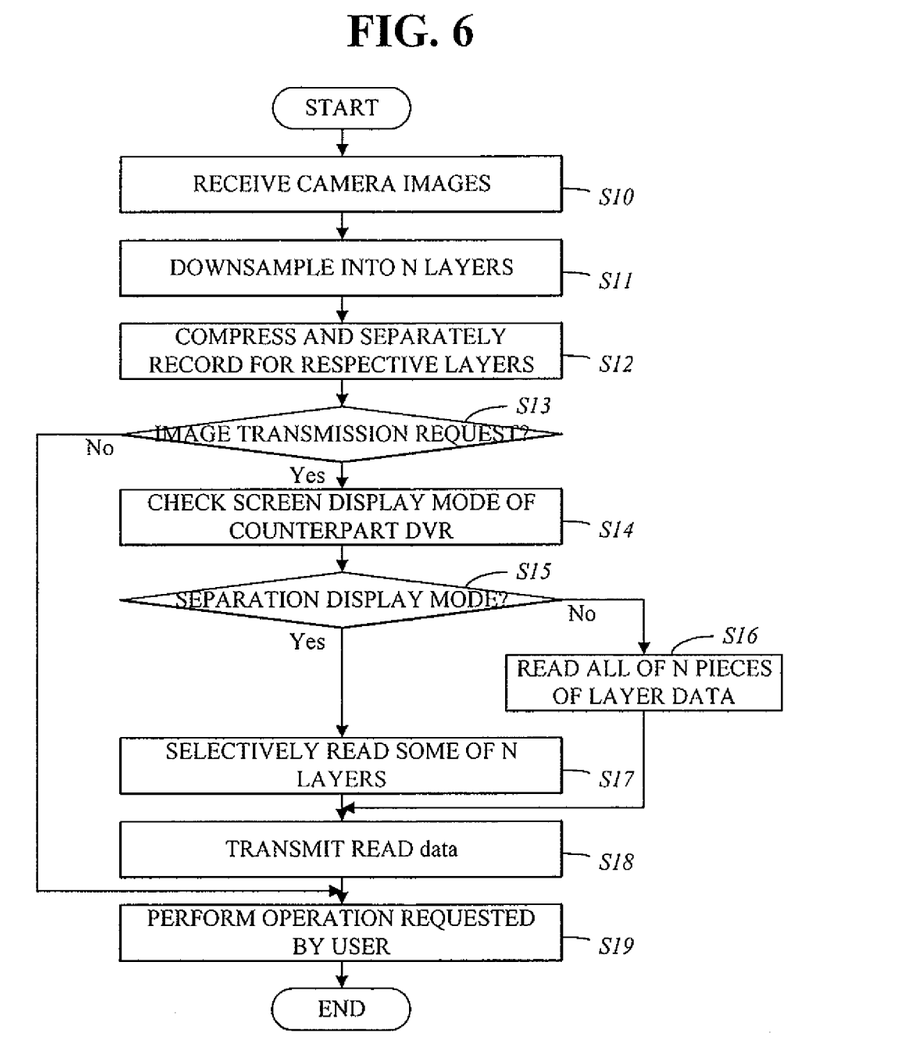
FIG. 6 is an operating flowchart of a method of transmitting data according to an embodiment of the present invention.

FIG. 6 is an operating flowchart showing a method of transmitting data according to an embodiment of the present invention. This method is implemented by the DVR of FIG. 5 and/or FIG. 1, but can be implemented in other suitable device or system.

The multi-channel DSP 11 receives camera image signals through first to sixteenth channels CH1 to CH16, processes the camera image signals as digital image data, and outputs the digital image data to the video display processor 10, thus enabling image data for channels, selected by an operator, to be displayed on a monitor screen according to a selected display mode at step S10.

The image sampling/combining unit 15 downsamples image data for each channel into N layers under the control of the controller 13 at step S11.

For example, as shown in FIG. 4, a first layer having a 352×240 pixel size is created by collecting pixels corresponding to '1' (odd-numbered pixels in a lateral direction and odd-numbered pixels in a vertical direction) from image data having a 704×480 pixel size, a second layer having a 704×240 pixel size is created by collecting pixels corresponding to '2' (even-numbered pixels in the lateral direction and odd-numbered pixels in the vertical direction), a third layer having a 352×240 pixel size is created by collecting pixels corresponding to '3' (odd-numbered pixels in the lateral direction and even-numbered pixels in the vertical direction), and a fourth layer is created by collecting pixels corresponding to '4' (even-numbered pixels in the lateral direction and even-numbered pixels in the vertical direction).

The multi-channel DSP 11 compresses the first to fourth layers, each having a 352×240 pixel size, in an MPEG format, and separately records the compressed layers in the storage 14 for respective layers at step S12.

When the transmission of image data is requested by a user or a counterpart DVR connected through the network module 12 at step S13, the controller 13 of the DVR 100 checks the screen display state of the counterpart DVR through the exchange of messages with the controller of the counterpart DVR at step S14.

Figure 7:
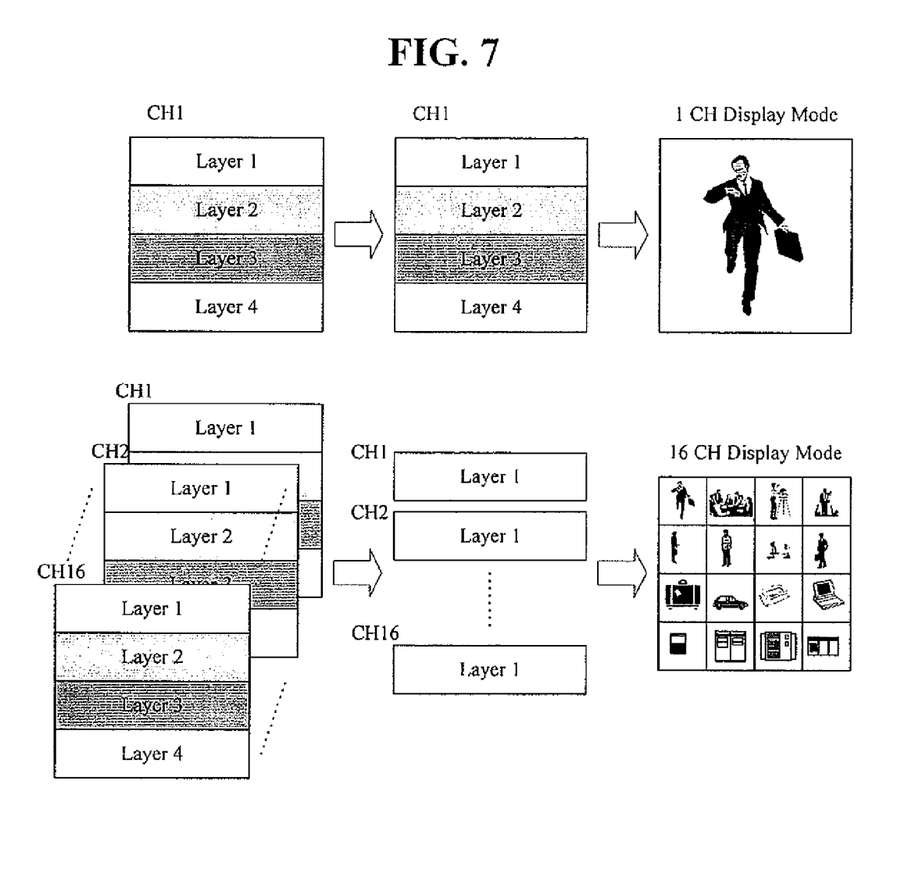
FIG. 7 is a diagram showing an embodiment in which all or part of data is transmitted according to the present invention.

When the screen display state of the counterpart DVR is not a separation display mode as a result of the checking at step S15 (for example, when the screen display state is in a 1 channel display mode (1 CH Display Mode), in which only an image for a single channel CH1 is displayed on the monitor screen, as shown in FIG. 7), the controller 13 reads all of the data corresponding to the first to fourth layers (Layer 1 to Layer 4) for the first channel, for which transmission is requested, from the storage 14 by controlling the multi-channel DSP 11 at step S16.

Meanwhile, when the screen display state of the counterpart DVR is in a separation display mode as a result of the checking at step S15 (for example, when the screen display state of the counterpart DVR is in a 16 channel display mode (16 CH Display Mode) in which 16 channel images are separately displayed on a monitor screen, as shown in FIG. 7), the controller 13 selectively reads only the data corresponding to the first layer from data corresponding to the first to fourth layers for respective channels, which have been separately recorded in the storage 14, by controlling the multi-channel DSP 11 at step S17.

The controller 13 transmits the read data to the counterpart DVR by controlling the network module 12 at step S18, and thereafter performs an operation requested by the user at step S19.

The controller of the counterpart DVR reconstructs the image data transmitted through the network module and displays the reconstructed image data on the monitor screen associated thereto according to a screen display mode by controlling the multi-channel DSP and the downsampling/combining unit of the counterpart DVR. When the screen display mode of the counterpart DVR is a 16 channel display mode, data corresponding to first layers for 16 channels is reconstructed, and the reconstructed data is inserted into the locations of corresponding channels, thus creating a single screen for the counterpart DVR. When the screen display mode of the counterpart DVR is a 1 channel display mode, data corresponding to first to four layers for a given channel is reconstructed, and the reconstructed layer data is combined, thus creating a single screen.

Meanwhile, when requesting image data from another DVR, a given DVR provides only the numbers of channels for which transmission is requested, thus enabling the transmission of the numbers of the channels to substitute for the transmission of a screen display mode. That is, when a screen display mode is a 1 channel display mode, the DVR transmits only the number of the single channel to be displayed on the screen. When the screen display mode is one of the remaining display modes, rather than the 1 channel display mode of FIG. 3, the DVR can transmit the numbers of channels to be separately displayed on the screen. Here, the screen can be a screen that is local or remote to the DVR.

As described above, the sizes of images captured and generated by a monitoring camera can be classified into a 352×240 pixel size, a 704×240 pixel size, and a 704×480 pixel size. The monitor screen of a DVR may have a resolution or image size much greater than the 704×480 pixel size so that data for a plurality of channels can be simultaneously displayed on the monitor screen.

That is, even if a screen display mode is a 4 channel display mode in the example of FIG. 3, respective resolutions of four channels, separately displayed on the screen, may be greater than 352×240 pixel size, which means that, when the transmission of image data is requested, the image size of the channel, for which transmission is requested, must also be transmitted therewith.

Therefore, in a message for requesting the transmission of image data, information about the number of requested channels, the numbers of respective channels, for which transmission is requested, the sizes of images in which respective channels are to be displayed, etc. can be contained. Further, the DVR receiving the message can designate the number of layers to be transmitted depending on the image sizes of channels for which transmission is requested.

For example, when the resolution of the monitor screen of the DVR, having requested the transmission of image data, is 800×600 pixel size, and a selected screen display mode is the user 1 display mode of FIG. 3, the image size of the first channel is a 533×400 pixel size, and the image size of each of the second to sixth channels is a 267×200 pixel size.

Therefore, the counterpart DVR, having requested the transmission of image data, transmits a message including this information, e.g., information indicating that the number of requested channels is 6, the image size of the first channel is a 533×400 pixel size, and the image size of each of the second to sixth channels is a 267×200 pixel size. On the other side, the DVR, having received this message from the counterpart DVR, transmits all of the first to fourth layers for the first channel, and only the first layers for the second to sixth channels.

In the above examples the DVR, having received the transmission request, can adjust the transmission sequence and can thus transmit image data in the sequence of the fourth layer, the second layer and the third layer for the first channel after transmitting all of the first layers for the first to sixth channels.

Further, in another example, when the image size of the first channel for which transmission is requested is (for example, a 400×300 pixel size (120,000 pieces of pixel data)), the DVR can transmit only part of first channel data, that is first and fourth layer data (168,960 pieces of pixel data), rather than transmitting all of the data (337,920 pieces of pixel data) corresponding to first to fourth layers, each having a 352×240 pixel size (84,480 pieces of pixel data). The reason for this is that 120,000 pieces of pixel data can be sufficiently obtained from 168,960 pieces of pixel data, corresponding to the first and fourth layers, without causing resolution loss.

Further, according to the transmission environment (e.g., when the transmission environment is bad, or when the amount of data for which transmission is requested is large), the DVR having received the transmission request can transmit only data corresponding to the first layer, or only an amount of data smaller than the amount of data for which transmission is requested, even for a channel for which the transmission of data having a large image size has been requested. In the above example, when the transmission environment is bad, only the first layer data, or only the first and fourth layer data for the first channel can be transmitted. When only the first and fourth layer data is transmitted, the counterpart DVR having received the layer data can create an image having a size, which has been allocated to the given channel, through interpolation.

The image size of each layer, the number of layers, a downsampling method, etc. are only examples of the invention, and the invention is not limited to the above examples. Further, the term 'channel' has been used to distinguish images having different sources from each other, and the term 'layer' has been used to indicate a plurality of images created by downsampling image data, but other terms can be used to designate the channel and the layer. Therefore, the terms of the present invention are not limited to 'channel' and 'layer', but other terms for designating components performing functions identical or similar to those of the channel and the layer can be used in the present invention.

Therefore, the present invention offers many advantages including, e.g., it enables efficient data transmission, minimizes the increase in the load of a network, and prevents the occurrence of error in data transmission.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting image data via a multi-channel Digital Video Recorder (DVR), the method comprising:
    receiving, from a plurality of cameras via a plurality of channels, a plurality of image data, respectively;
    downsampling, by the multi-channel DVR, each of the plurality of image data into N layers corresponding to different display sizes of each of the plurality of image data, respectively, each of the N layers being smaller in size than an original size of each of the corresponding plurality of image data, an nth layer of the N layers being generated by collecting every nth pixel of each of N pixels of each of the corresponding plurality of image data in a lateral and vertical direction, where n is a natural number smaller than or equal to N and N is a natural number larger than 1;
    compressing the downsampled N layers for the different display sizes of each of the corresponding plurality of image data; and
    transmitting, to a counterpart DVR connected to the multi-channel DVR via a network, more than one of the downsampled and compressed N layers for displaying each of more than one of the corresponding plurality of image data of a particular size on the counterpart DVR,
    wherein a first layer of each the more than one of the downsampled and compressed N layers for displaying each of more than one of the corresponding plurality of image data of the particular size is transmitted to the counterpart DVR and subsequently remaining layers of each the more than one of the downsampled and compressed N layers for displaying each of more than one of the corresponding plurality of image data of the particular size are transmitted to the counterpart DVR, and
    wherein, when a display size of the counterpart DVR for a particular image data of the corresponding plurality of image data is greater than a screen size of the downsampled and compressed N layers for displaying the particular image data of the particular size, all of the downsampled and compressed N layers for displaying the particular image data of the particular size are transmitted.

2. The method according to claim 1, wherein the image data is downsampled in a lateral direction and a vertical direction at a rate of 1:n (where n×n=N, n>1), thus forming a single layer.

3. The method according to claim 1, wherein, when the counterpart DVR is in a separation display mode, all or some of the more than one of the downsampled and compressed N layers for displaying each of more than one of the corresponding plurality of image data of the particular size, are transmitted to the counterpart DVR.

4. The method according to claim 1, wherein a transmission sequence of respective layers is adjusted prior to the transmission of the downsampled and compressed N layers for displaying the particular image data of the particular size.

5. The method according to claim 1, wherein, when the transmission of each of more than one of the corresponding plurality of image data of the particular size is requested, information about numbers of respective channels for which transmission is requested, and information about a display size allocated to each channel are transmitted therewith.

6. The method according to claim 1, wherein each of the layers includes a header.

7. The method according to claim 6, wherein the header includes the following:
    information about a number of a channel to which a given layer belongs,
    information about the number of layers included in the channel to which the given layer belongs,
    information about a number of the given layer, and
    information about a screen size of the given layer.

8. A multi-channel Digital Video Recorder (DVR) for transmitting image data, the device comprising:
    a data processor configured to:
    receive, from a plurality of cameras via a plurality of channels, a plurality of image data, respectively,
    downsample each of the plurality of image data into N layers corresponding to different display sizes for each of the plurality of image data, respectively, each of the N layers being smaller in size than an original size of each of the corresponding plurality of image data, an nth layer of the N layers being generated by collecting every nth pixel of each of N pixels of each of the corresponding plurality of image data in a lateral and vertical direction, where n is a natural number smaller than or equal to N and N is a natural number larger than 1, and
    compress the downsampled N layers for the different display sizes of each of the corresponding plurality of image data; and
    a transmitting unit to transmit, to a counterpart DVR connected to the multi-channel DVR via a network, at least one of the downsampled and compressed N layers for a particular size for displaying each of more than one of the corresponding plurality of image data on the counterpart DVR,
    wherein, the transmitting unit is configured to transmit a first layer of each the more than one of the downsampled and compressed N layers for displaying each of more than one of the corresponding plurality of image data of the particular size to the counterpart DVR and subsequently transmit remaining layers of each the more than one of the downsampled and compressed N layers for displaying each of more than one of the corresponding plurality of image data of the particular size to the counterpart DVR, and
    wherein, when a display size of the counterpart DVR for a particular image data of the corresponding plurality of image data is greater than a screen size of the downsampled and compressed N layers for displaying the particular image data of the particular size, all of the downsampled and compressed N layers for displaying the particular image data of the particular size are transmitted by the transmitting unit.

9. The device according to claim 8, wherein the data processor downsamples the image data in a lateral direction and a vertical direction at a rate of 1:n (where n×n=N, n>1), thus forming a single layer.

10. The device according to claim 8, wherein, when the counterpart DVR is in a separation display mode, all or some of the more than one of the downsampled and compressed N layers for displaying each of more than one of the corresponding plurality of image data of the particular size, are transmitted to the counterpart DVR.

11. The device according to claim 8, wherein each of the layers includes a header.

12. The device according to claim 11, wherein the header includes the following:
    information about a number of a channel to which a given layer belongs,
    information about the number of layers included in the channel to which the given layer belongs, and
    information about a number of the given layer, and information about a screen size of the given layer.

* * * * *